(12) United States Patent
Sugiyama

(10) Patent No.: US 7,260,315 B2
(45) Date of Patent: Aug. 21, 2007

(54) SIGNAL PROCESSING APPARATUS

(75) Inventor: Akira Sugiyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 1081 days.

(21) Appl. No.: 10/305,044

(22) Filed: Nov. 26, 2002

(65) Prior Publication Data

US 2003/0123536 A1 Jul. 3, 2003

(30) Foreign Application Priority Data

Nov. 27, 2001 (JP) ............................. 2001-361528

(51) Int. Cl.
*H04N 7/26* (2006.01)
(52) U.S. Cl. ..................................... 386/109; 386/112
(58) Field of Classification Search ........ 386/109–112; 348/705
See application file for complete search history.

(56) References Cited

U.S. PATENT DOCUMENTS 5,604,494 A 2/1997 Murakami et al.
5,832,085 A * 11/1998 Inoue et al. ................. 386/124
6,397,000 B1 * 5/2002 Hatanaka et al. ............. 386/98

FOREIGN PATENT DOCUMENTS

JP 10-304362 11/1998
JP 10-304363 11/1998

* cited by examiner

*Primary Examiner*—Thai Q. Tran
*Assistant Examiner*—Mishawn Dunn
(74) *Attorney, Agent, or Firm*—Frommer Lawrence & Haug LLP; William S. Frommer

(57) ABSTRACT

An optimum quantization rounding process can be executed regardless of which of a digital interface or an analog interface is selected. Which of the analog interface or the digital interface is used as an input interface of a video signal is selected by an operation panel. An input selection signal and a round setting signal are outputted from a system controller. The proper input interface is selected on the basis of the input selection signal and the round setting signal is supplied to an MPEG encoder. In the encoder, quantization rounding precision upon quantization is set in accordance with a quantization scale value and is set in accordance with the selection of the analog interface or the digital interface in response to the round setting signal.

5 Claims, 10 Drawing Sheets

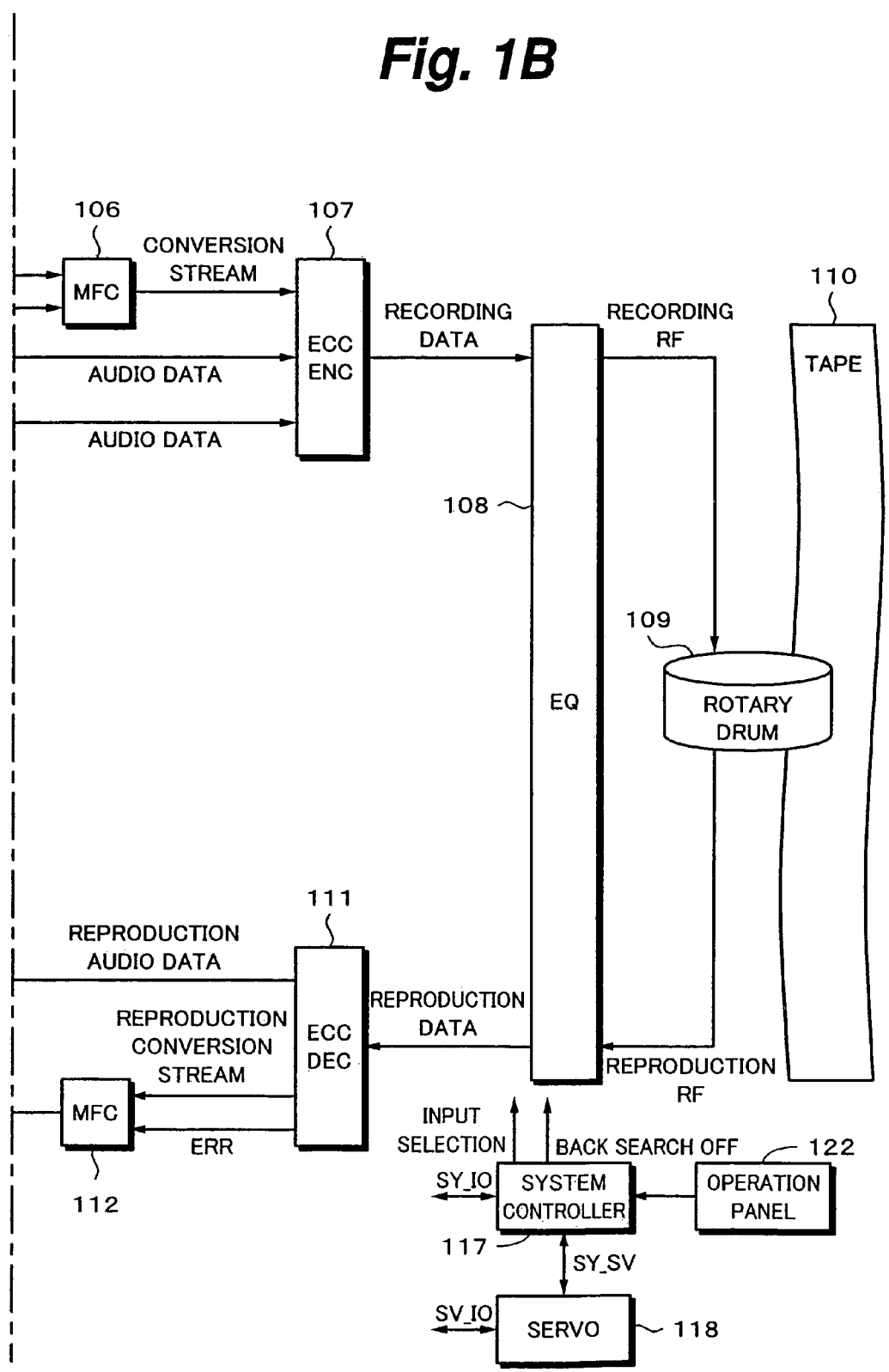

| 8  | 16 | 19 | 22 | 26 | 27 | 29 | 34 |
| 16 | 16 | 22 | 24 | 27 | 29 | 34 | 37 |
| 19 | 22 | 26 | 27 | 29 | 34 | 34 | 38 |
| 22 | 22 | 26 | 27 | 29 | 34 | 37 | 40 |
| 22 | 26 | 27 | 29 | 32 | 35 | 40 | 48 |
| 26 | 27 | 29 | 32 | 35 | 40 | 48 | 48 |
| 26 | 27 | 29 | 34 | 38 | 46 | 56 | 69 |
| 27 | 29 | 35 | 38 | 46 | 56 | 69 | 83 |

Fig. 7A
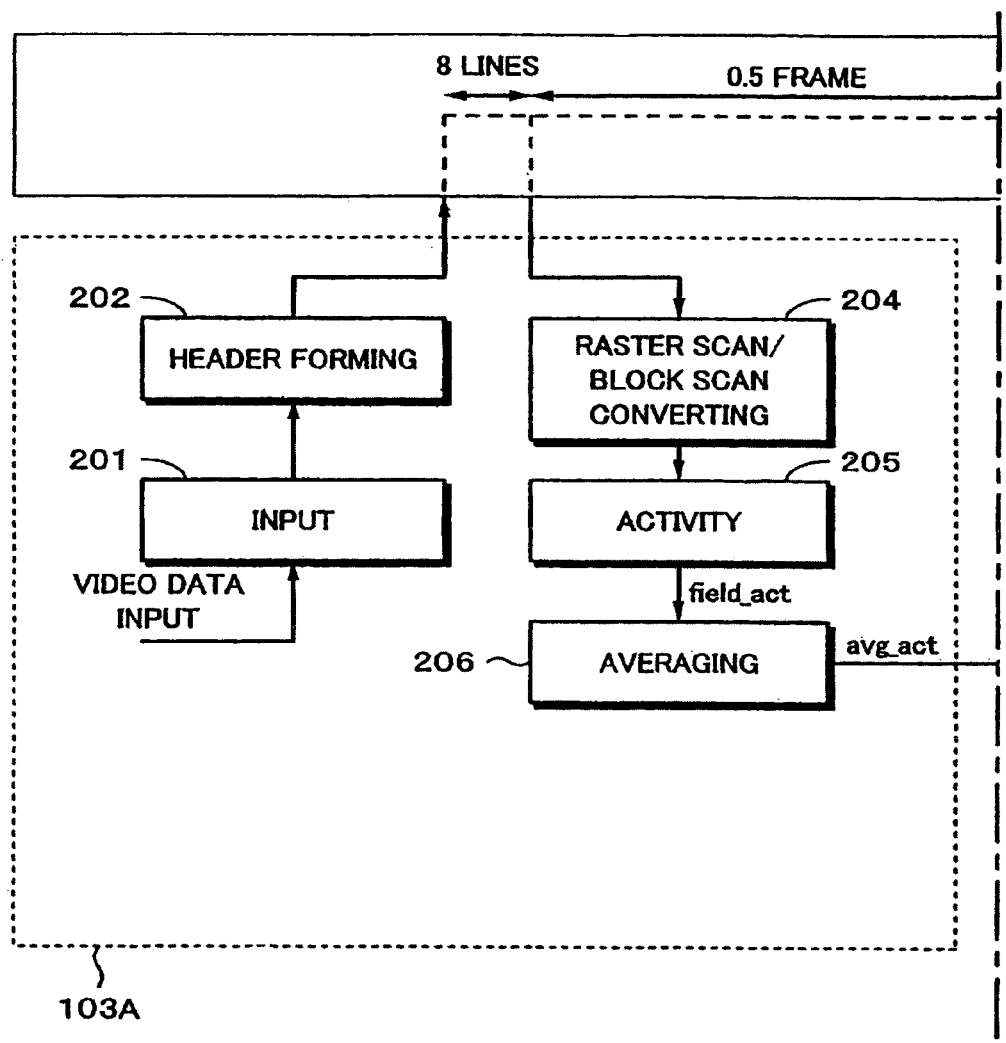
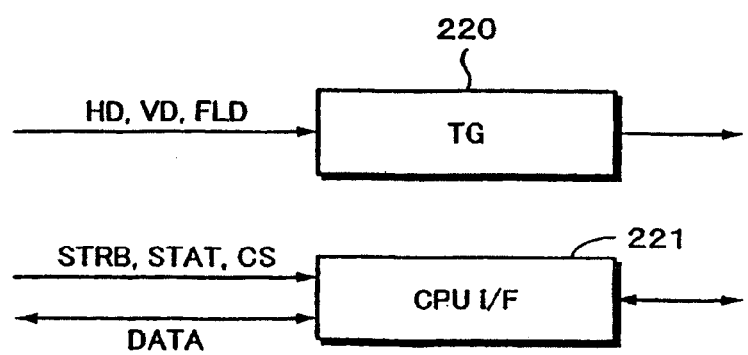

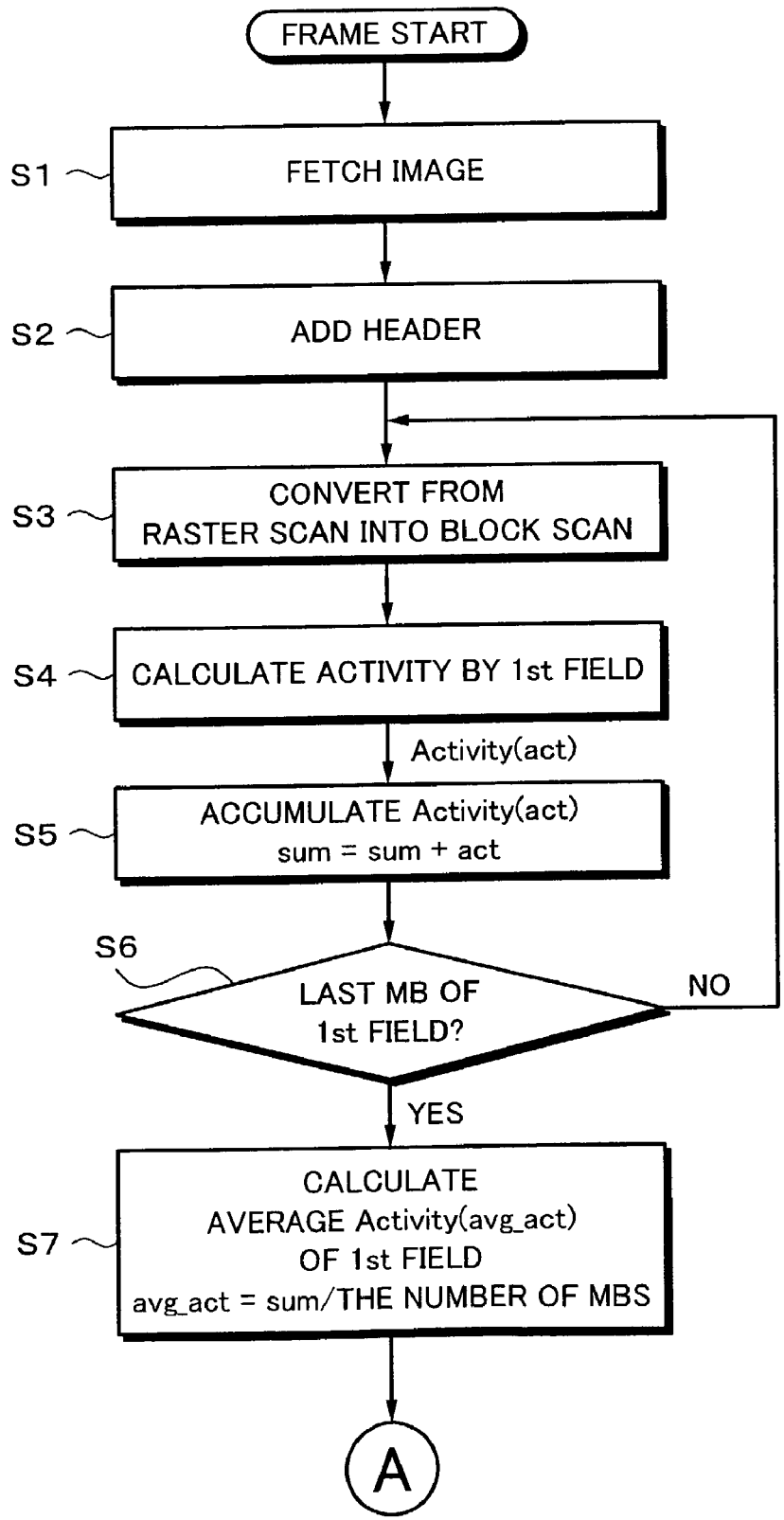

SIGNAL PROCESSING APPARATUS

BACKGROUND OF THE INVENTION

1. Field of the Invention

The invention relates to a signal processing apparatus for compression encoding a digital video signal.

2. Description of the Related Arts

As represented by a digital VTR (Video Tape Recorder), a data recording and reproducing apparatus for recording a digital video signal and a digital audio signal onto a recording medium and reproducing them from the recording medium has been known. Generally, since a data amount of the digital video signal is very large, the signal is compression encoded and recorded onto the recording medium. In recent years, an MPEG2 (Moving Picture Experts Group 2) system has been known as a standard system for compression encoding.

In the MPEG2, data obtained by predictive coding using motion detection and a DCT (Discrete Cosine Transform) is quantized and compression encoded and, further, compression efficiency is improved by using variable length coding.

In the case of a frame unit, the compression encoding using the DCT is executed. For example, the inputted digital video signal is divided on a block unit basis, a DCT arithmetic operation is executed to the divided blocks, and coefficients obtained by the DCT arithmetic operation are quantized. Quantized representative values are variable length coded and compression encoded. Hitherto, as quantization rounding precision which is used upon quantization in the DCT arithmetic operation, for example, a predetermined method such as method whereby fractions of 5 and over are counted as a unit and the rest is disregarded, method whereby fractions of 6 and over are counted as a unit and the rest is disregarded, method whereby the figures after a predetermined numerical value are omitted, or the like has fixedly been used.

In the case where the rounding precision upon quantization is fixed and the quantization is executed as mentioned above, it is difficult to efficiently compression encode both an image which can be easily quantized and an image which is difficult to be quantized. As a method of dynamically changing the rounding precision upon quantization, for example, a method of changing the quantization rounding precision in dependence on a magnitude of an amplitude of a DCT coefficient as disclosed in JP-A-10-304362, or a method of changing the quantization rounding precision in dependence on a frequency component of the DCT coefficient as disclosed in JP-A-10-304363 has been proposed. However, even if such a method is used, picture quality is deteriorated by predetermined encoding noises.

In recent years, the video signal is generally digitized and handled as a digital video signal, while an analog video signal according to a conventional analog system is still used. In such a case, for example, an analog interface corresponding to the analog video signal is provided for the digital VTR. The analog video signal is inputted to the analog interface, converted into the digital video signal, and processed.

Hitherto, the quantization rounding precision which can be set every quantization scale value is constant for the same quantization scale value both in a digital interface environment and an analog interface environment.

However, the analog interface has various unstable factors which are peculiar to an analog circuit, such as disturbance of waveform characteristics, variation in frequency characteristics, and the like which are caused by factors such as influence of noises, variation in adjustment, and temperature drift. Therefore, in the case of using the analog interface, a problem such that noise components are emphasized, an S/N ratio deteriorates, or the like is caused, so that the rounding precision for obtaining the picture quality that is optimum in the analog interface environment is not always obtained.

OBJECTS AND SUMMARY OF THE INVENTION

It is, therefore, an object of the invention to provide a signal processing apparatus in which regardless of which of a digital interface or an analog interface is selected, a quantization rounding process which is optimum to the selected interface can be executed.

To accomplish the above object, according to the invention, there is provided a signal processing apparatus comprising: an analog interface unit to which a video signal of an analog system is inputted and which converts the inputted video signal of the analog system into a video signal of a digital system and outputs it; a digital interface unit to which the video signal of the digital system is inputted; an interface selector for selecting either the analog interface unit or the digital interface unit; a DCT arithmetic operator for executing a DCT arithmetic operation on a block unit basis to the video signal outputted from the analog interface unit or the digital interface unit selected by the interface selector; a quantization scale value setter for setting a quantization scale value to quantize DCT coefficients obtained by DCT arithmetic operating the video signal on a block unit basis by the DCT arithmetic operator; a quantization rounding precision setter for setting quantization rounding precision in accordance with the quantization scale value set by the quantization scale value setter and the selection of the analog interface unit or the digital interface unit by the interface selector; and a quantizer for quantizing the DCT coefficients obtained by the DCT arithmetic operation executed by the DCT arithmetic operator on the basis of the quantization scale value set by the quantization scale value setter and the quantization rounding precision set by the quantization rounding precision setter.

The above and other objects and features of the present invention will become apparent from the following detailed description and the appended claims with reference to the accompanying drawings.

BRIEF DESCRIPTION OF THE DRAWINGS

FIG. 8 is a flowchart of an example in the case where a process of the MPEG encoder is executed by software;

DETAILED DESCRIPTION OF THE PREFERRED EMBODIMENT

An embodiment of the invention will be described hereinbelow. According to the invention, video data is divided into blocks and the DCT is executed every block. When DCT coefficients obtained by the DCT are quantized and the video data is compression encoded, quantization rounding precision of each quantization scale which is used for the quantization in the case where the digital interface is selected as an input interface of the video data and that in the case where the analog interface is selected are set to different precision values, thereby enabling an optimum quantization rounding process to be executed in each case.

The embodiment which will be described hereinbelow is a preferred specific example of the invention and although various limitations which are technically preferable are added to the embodiment, a scope of the invention is not limited to it in the following description, particularly, unless otherwise there is a disclosure showing that the invention is limited.

Figure 1A:
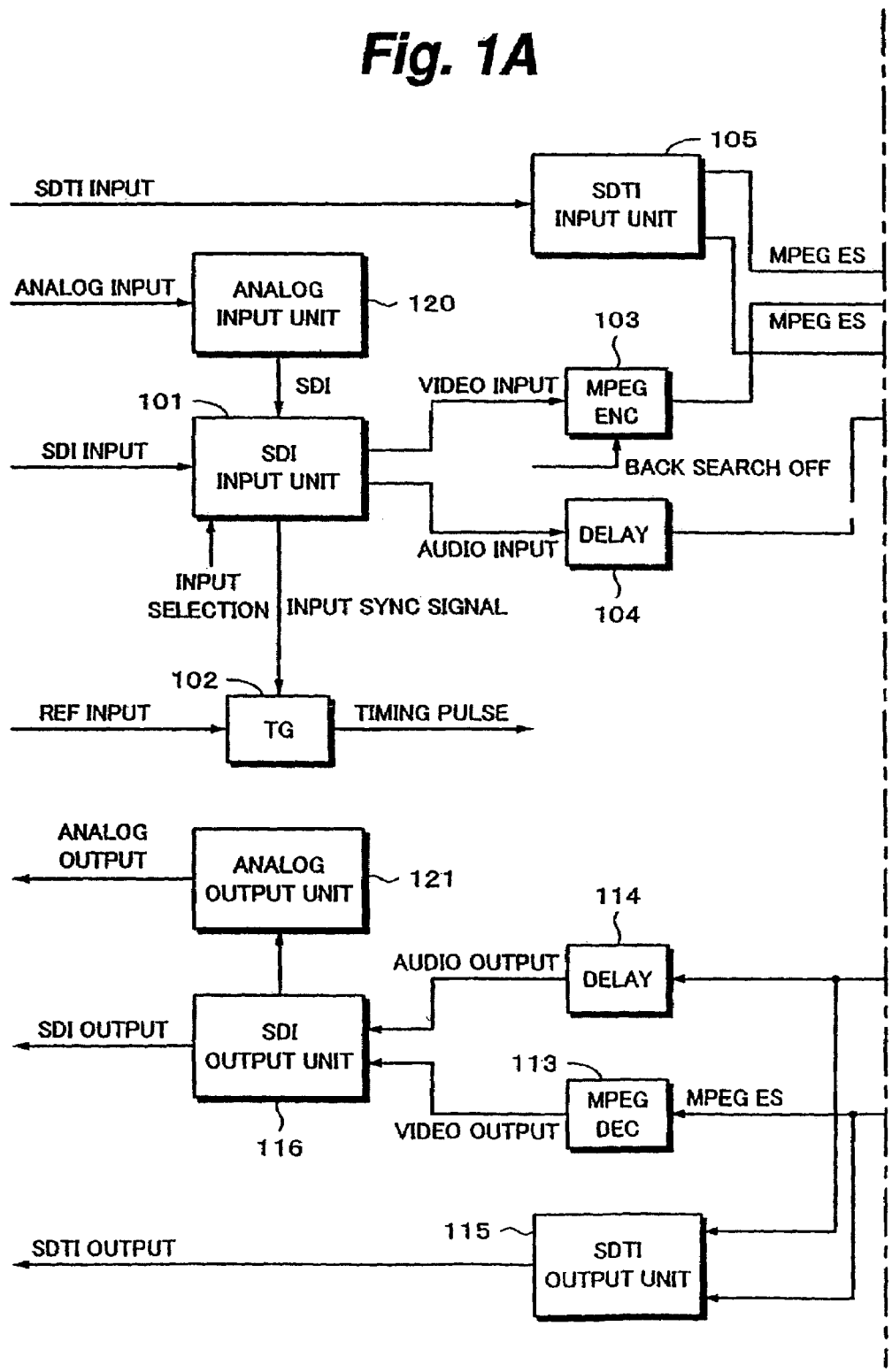
FIG. 1 is a block diagram showing a construction of an example of a digital VTR to which an embodiment of the invention is applied.

The embodiment of the invention will now be described. FIG. 1 shows a construction of an example of a digital VTR to which the embodiment of the invention is applied. According to the digital VTR, the digital video signal which has been compression encoded by the MPEG system is directly recorded onto a recording medium.

The invention can be applied to an apparatus such as an image encoding apparatus or the like other than the digital VTR.

First, a construction and a processing operation of a recording system in the digital VTR will be explained. Signals which are inputted from the outside to this recording system are: two kinds of serial digital interface signals comprising an SDI (Serial Data Interface) signal and an SDTI (Serial Data Transport Interface) signal; an analog interface signal; and an external reference signal REF as a control signal.

The SDI is an interface specified by an SMPTE in order to transmit a (4:2:2) component video signal, a digital audio signal, and additional data. The SDTI is an interface for transmitting an MPEG elementary stream (hereinafter, abbreviated to an "MPEG ES") as a stream obtained by compression encoding the digital video signal by the MPEG system. The ES is a component of 4:2:2 and is a stream comprising all I pictures as mentioned above, and there is a relation of 1 GOP=1 picture. According to a format of SDTI-CP (Content Package), the MPEG ES is separated to access units and packed into a packet of a frame unit. In the SDTI-CP, since an enough transmission band (27 MHz or 36 MHz at a clock rate; 270 Mbps or 360 Mbps at a stream bit rate) is used, the ES can be transmitted in a burst manner for one frame period of time.

The SDI signal which is transmitted by the SDI is inputted to an SDI input unit 101. An analog input signal comprising an analog video signal is inputted to an analog input unit 120. The analog input unit 120 converts the inputted analog input signal into a digital signal, maps it into, for example, the foregoing SDI format, and outputs it. The SDI signal obtained by converting the analog input signal and mapping into the SDI format is supplied to the SDI input unit 101.

On the basis of an input selection signal, the SDI input unit 101 selects either the SDI signal supplied from the analog input unit 120 or the SDI signal directly supplied from the outside to the SDI input unit 101. As will be explained hereinbelow in detail, the input selection signal is a control signal which is supplied from a system controller 117 in accordance with the operation to an operation panel 122. The SDI input unit 101 converts the SDI signal selected on the basis of the input selection signal into a parallel signal from the serial signal, outputs the parallel signal, extracts an input sync signal as a phase reference of an input included in the SDI signal, and outputs the sync signal to a timing generator TG 102.

The SDI input unit 101 separates the video signal and the audio signal from the converted parallel signal. The separated video input signal and audio input signal are outputted to an MPEG encoder 103 and a delay circuit 104, respectively.

The timing generator TG 102 extracts a reference sync signal from the inputted external reference signal REF. The timing generator TG generates a timing signal necessary for the digital VTR synchronously with the designated one of the reference sync signal and the input sync signal supplied from the SDI input unit 101, and supplies the generated timing signal as a timing pulse to each block.

The MPEG encoder 103 DCT transforms the video input signal into coefficient data, quantizes the coefficient data, and variable length encodes it. Variable length coding (VLC) data which is outputted from the MPEG encoder 103 is the elementary stream (ES) according to the MPEG2. This output data is supplied to one input terminal of a multiformat converter on the recording side (hereinafter, referred to as a recording side MFC) 106.

In the embodiment, in the MPEG encoder 103, the rounding precision which is set at the time of quantizing the coefficient data on the basis of the quantization scale is adaptively set in accordance with the quantization scale value. As will be explained hereinbelow in detail, the rounding precision in the case where the digital interface is selected as an input interface of the video signal and that in the case where the analog interface is selected are set to different values, so that the different precision value is used in each case.

The set value of the quantization rounding precision according to the quantization scale value is read out from a table 222, which will be explained hereinlater, and used. The set value corresponding to either the analog interface or the digital interface selected as an input interface is loaded into the table 222 in response to a table control signal which is outputted from the system controller 117, which will be explained hereinlater, on the basis of the selection of the input interface.

The delay circuit 104 functions as a delay line for delaying the audio input signal as non-compression data in accordance with a delay which is caused in a process for the video signal in the MPEG encoder 103. The audio signal delayed by the delay circuit 104 is outputted to an ECC encoder 107. This is because the audio signal is handled as a non-compression signal in the digital VTR according to the embodiment.

The SDTI signal transmitted and supplied from the outside by the SDTI is inputted to an SDTI input unit 105. Synchronization of the SDTI signal is detected by the SDTI input unit 105, the SDTI signal is once stored into a buffer, and the elementary stream is extracted. The extracted elementary stream is supplied to the other input terminal of the recording side MFC 106. The sync signal whose synchronization has been detected is supplied to the timing generator TG 102 mentioned above (not shown).

The SDTI input unit 105 further extracts digital audio signal from the inputted SDTI signal. The extracted digital audio signal is supplied to the ECC encoder 107.

As mentioned above, the digital VTR according to the embodiment can directly input the MPEG ES independent of the video signal of a base band which is inputted from the SDI input unit 101.

The recording side MFC 106 has a stream converter and a selector, selects one of the MPEG ESs supplied from the SDI input unit 101 and the SDTI input unit 105, combines the DCT coefficients of the selected MPEG ES every frequency component over a plurality of DCT blocks constructing one macro block, and rearranges the combined frequency components in order from a low frequency component. The stream obtained by rearranging the coefficients of the MPEG ESs is called a conversion elementary stream hereinbelow. By rearranging the MPEG ESs as mentioned above, even in a search reproducing mode, many DCT coefficients and AC coefficients of a low degree as much as possible are collected, thereby contributing to the improvement of quality of the search picture. The conversion elementary stream is supplied to the ECC encoder 107.

A main memory of a large capacity (not shown) is connected to the ECC encoder 107. The ECC encoder 107 has therein a packing and shuffling unit, an audio outer code encoder, a video outer code encoder, an inner code encoder, an audio shuffling unit, a video shuffling unit, and the like. The ECC encoder 107 also includes a circuit for adding IDs on a sync block unit basis and a circuit for adding the sync signal. In the first embodiment, a product code is used as an error correction code for the video signal and the audio signal. The product code is used for encoding the outer code in the vertical direction of a 2-dimensional array of the video signal or audio signal and encoding an inner code in the lateral direction, thereby double-encoding a data symbol. A Reed-Solomon code can be used as an outer code and an inner code.

The conversion elementary stream outputted from the MFC 106 is supplied to the ECC encoder 107 and the audio signals outputted from the SDTI input unit 105 and the delay circuit 104 are also supplied. The ECC encoder 107 executes shuffling and error correction encoding to the supplied conversion elementary stream and audio signals, adds the ID and the sync signal to each sync block, and outputs the resultant data as recording data.

The recording data outputted from the ECC encoder 107 is converted into a recording RF signal by an equalizer EQ 108 including a recording amplifier. The recording RF signal is supplied to a rotary drum 109 having a rotary head and recorded onto a magnetic tape 110. A plurality of magnetic heads in which azimuths of the heads which form adjacent tracks are different are actually attached to the rotary drum 109.

A scrambling process can be also executed to the recording data as necessary. Digital modulation can be also executed upon recording. Further, Partial Response Class 4 and a Viterbi code can be also used. The equalizer 108 includes both of a construction on the recording side and a construction on the reproducing side.

Subsequently, a construction and the processing operation of a reproducing system in the digital VTR will be described. Upon reproduction, a reproduction signal reproduced from the magnetic tape 110 by the rotary drum 109 is supplied to the construction on the reproducing side of the equalizer 108 including a reproducing amplifier or the like. In the equalizer 108, equalization, waveform shaping, or the like is also executed to the reproduction signal. Demodulation of the digital modulation, Viterbi decoding, or the like is executed as necessary. An output of the equalizer 108 is supplied to an ECC decoder 111.

The ECC decoder 111 executes a process opposite to that of the ECC encoder 107 mentioned above and includes a main memory of a large capacity, an inner code decoder, deshuffling units for audio and video, and an outer code decoder. Further, the ECC decoder 111 includes a deshuffling and depacking unit and a data interpolating unit as units for video. Similarly, the ECC decoder 111 includes an audio AUX separating unit and a data interpolating unit as units for audio.

In the ECC decoder 111, synchronization of the reproduction data is detected, a sync signal added to the head of a sync block is detected, and the sync block is extracted. In the reproduction data, an error correction of an inner code of each sync block is performed, and thereafter, an ID interpolating process is executed to the sync block. The ID-interpolated reproduction data is separated into the video data and audio data. The video data and audio data are deshuffled, respectively, and the order of the data which was shuffled upon recording is returned to the original order. In the deshuffled data, errors of the outer code are corrected, respectively.

In the ECC decoder 111, an error flag is set with respect to the data having uncorrectable errors exceeding error correcting ability. A signal ERR indicative of the data including the errors is outputted with respect to the errors of the video data.

The error corrected reproduction audio data is supplied to an SDTI output unit 115 and, at the same time, is delayed by a delay circuit 114 and supplied to an SDI output unit 116. The delay circuit 114 is provided to absorb a delay which is caused by the process of the video data in an MPEG decoder 113, which will be explained hereinlater.

The error corrected video data is supplied as a reproduction conversion elementary stream to a reproducing side MFC 112. The foregoing signal ERR is also supplied to the reproducing side MFC 112. The reproducing side MFC 112 executes a process opposite to the process executed by the recording side MFC 106 mentioned above and includes a stream converter. The stream converter executes a process opposite to the process executed by the stream converter on the recording side. That is, the DCT coefficients arranged over the DCT block every frequency component are rearranged every DCT block. Thus, the reproduction signal is converted into the elementary stream according to the MPEG2. At this time, if the signal ERR is supplied from the ECC decoder 111, the corresponding data is replaced with a signal which conforms perfectly with the MPEG2 and outputted.

The MPEG ES outputted from the reproducing side MFC 112 is supplied to the MPEG decoder 113 and the SDTI output unit 115. The MPEG decoder 113 decodes the supplied MPEG ES and returns it to the original non-compressed video signal. That is, the MPEG decoder 113 executes an inverse quantizing process and an inverse DCT process to the supplied MPEG ES. The decoded video signal is supplied to the SDI output unit 116.

As mentioned above, the audio data separated from the video data by the ECC decoder 111 is supplied to the SDI output unit 116 via the delay circuit 114. The SDI output unit 116 maps the supplied video data and audio data into a format of the SDI and converts them into the SDI signal having a data structure of the SDI format. This SDI signal is outputted to the outside. At the same time, the digital signal of the video data and audio data is converted into an analog signal and outputted to the outside by an analog output unit 121.

On the other hand, the audio data separated from the video data by the ECC decoder 111 as mentioned above is supplied to the SDTI output unit 115. The SDTI output unit 115 maps the supplied video data and audio data as an elementary stream into a format of the SDTI, converts them into an SDTI signal having a data structure of the SDTI format, and outputs the SDTI signal to the outside.

The system controller 117 comprises, for example, a microcomputer and communicates with each block by a signal SY_IO, thereby controlling the whole operation of the digital VTR. When switches provided for the operation panel 122 are operated, a control signal according to the operation is supplied to the system controller 117. On the basis of the control signal, the operation for recording, reproduction, or the like in the recording and reproducing apparatus is controlled by the system controller 117. The selection of the analog interface or the digital interface in the SDI input unit 101 mentioned above is also controlled by an operation to the operation panel 122.

A servo 118 performs running control of the magnetic tape 110, drive control of the rotary drum 109, or the like by a signal SV_IO while communicating with the system controller 117 by a signal SY_SV.

Figure 2:
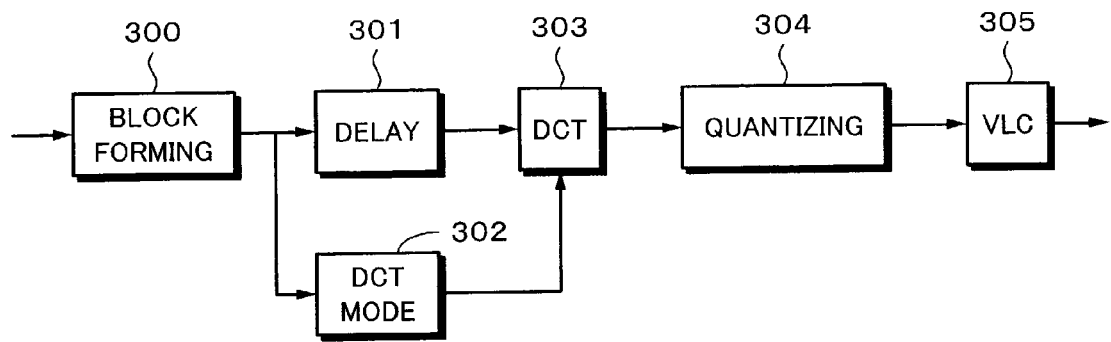
FIG. 2 is a block diagram schematically showing a construction of an example of an MPEG encoder in the digital VTR according to the embodiment.

FIG. 2 schematically shows a construction of an example of the MPEG encoder 103 in the digital VTR in FIG. 1. As main functions of the MPEG encoder 103, there are the following functions.

(1) Intraframe encoding
(2) Fixed length coding in one frame to record onto the magnetic tape
(3) Back search to maintain picture quality upon dubbing Among them, since the functions (2) "Fixed length coding in one frame to record onto the magnetic tape" and (3) "Back search to maintain picture quality upon dubbing" are not directly concerned with the invention, their descriptions are omitted.

As shown in FIG. 2, the MPEG encoder 103 schematically comprises: a block forming circuit 300; a delay circuit 301; a DCT mode selecting circuit 302; a DCT circuit 303; a quantizing circuit 304; and a variable length coding (VLC) circuit 305.

The digital video signal supplied to the MPEG encoder 103 is converted into raster blocks by the block forming circuit 300, divided into DCT block units for performing the DCT, and outputted. The DCT block is constructed in a matrix form of, for example, 8 pixels×8 pixels and comprises one DC component and 63 AC coefficients.

The data outputted from the block forming circuit 300 on a DCT block unit basis is delayed by the delay circuit 301 and supplied to the DCT circuit 303 and the DCT mode selecting circuit 302. The DCT mode selecting circuit 302 switches a DCT mode in the DCT circuit 303 to a mode for performing the DCT on a field unit basis or a mode for performing the DCT on a frame unit basis. A mode selection signal outputted from the DCT mode selecting circuit 302 is supplied to the DCT circuit 303.

On the basis of the DCT mode selected by the DCT mode selecting circuit 302, the DCT circuit 303 executes the DCT to the data of the DCT block unit outputted from the delay circuit 301, thereby forming DCT coefficients. The formed DCT coefficients are supplied to the quantizing circuit 304.

The DCT coefficients outputted from the DCT circuit 303 are quantized by the quantizing circuit 304. The quantizing circuit 304 has a quantization scale value register (not shown) in which a quantization scale value (quantizer_scale) has been stored and executes the quantization of the DCT coefficients by using the quantization scale value stored in the quantization scale value register. At this time, the quantization rounding precision at the time of a quantization arithmetic operation is changed in accordance with the quantization scale value and the quantization according to a nature of an image is executed.

An output of the quantizing circuit 304 is supplied to the VLC circuit 305, variable length coded to the MPEG ES, and outputted.

A process in the quantizing circuit 304 will be more specifically explained. As a fundamental process in the quantizing circuit 304, each coefficient constructing the DCT block comprising 8 pixels×8 pixels mentioned above is weighted by using a preset weight coefficient (Intra_Quantizer_Matrix) and a division based on the quantization scale value (quantizer_scale) is performed to the weighted coefficient. A rounding process, as will be explained hereinlater, is executed to a result of the division and a representative value is selected.

Figure 3:
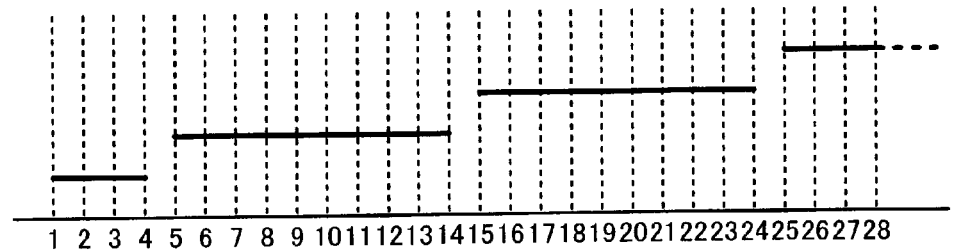
FIG. 3 is a schematic diagram showing a rounding process in the case where quantizer_scale=10 and rounding precision is based on a process for counting fractions of 5 and over as a unit and disregarding the rest.
Figure 4:
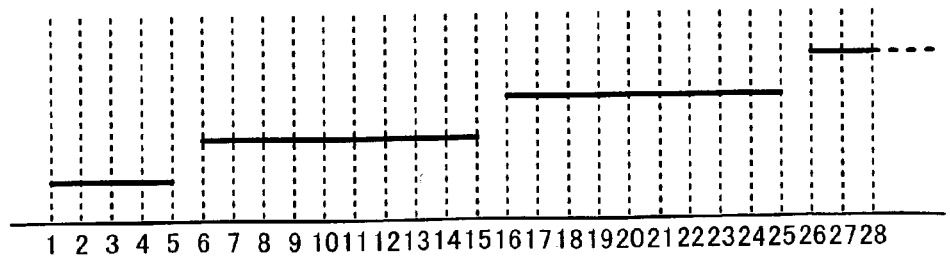
FIG. 4 is a schematic diagram showing a rounding process in the case where quantizer_scale=10 and the rounding precision is based on a process for counting fractions of 6 and over as a unit and disregarding the rest.
Figures 5, 6:
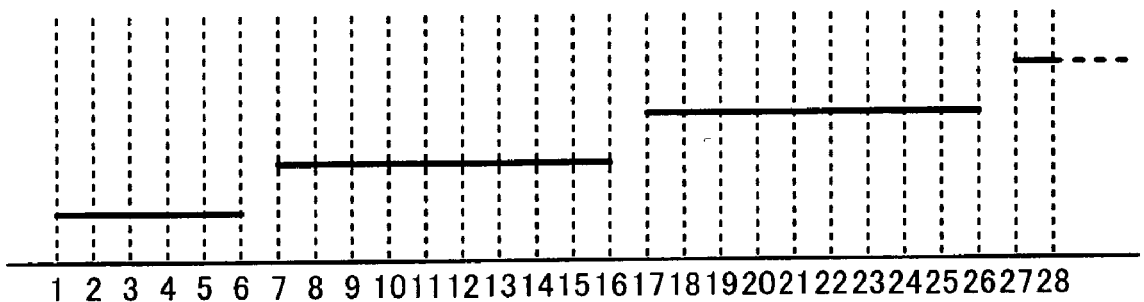
FIG. 5 is a schematic diagram showing a rounding process in the case where quantizer_scale=10 and the rounding precision is based on a process for counting fractions of 7 and over as a unit and disregarding the rest.
FIG. 6 is a schematic diagram showing a weight coefficient (Intra_Quantizer_Matrix) as an example for each of DCT coefficients.

For example, the method whereby fractions of 5 and over are counted as a unit and the rest is disregarded, method whereby fractions of 6 and over are counted as a unit and the rest is disregarded, or method whereby fractions of 7 and over are counted as a unit and the rest is disregarded can be used for the rounding precision which is used in the rounding process. FIG. 3 shows the rounding process in the case where quantizer_scale=10 and the rounding precision is based on the process for counting fractions of 5 and over as a unit and disregarding the rest. The sixth value from the bottom is selected as a representative value from numerical values segmented every 10 values shown by an axis of abscissa. For example, the representative value of the numerical values which are equal to or larger than 5 and are equal to or smaller than 14 is set to 10. FIG. 4 shows the rounding process in the case where quantizer_scale=10 and the rounding precision is based on the process for counting fractions of 6 and over as a unit and disregarding the rest. The fifth value from the bottom is selected as a representative value from numerical values segmented every 10 values shown by an axis of abscissa. For example, the representative value of the numerical values which are equal to or larger than 6 and are equal to or smaller than 15 is set to 10. FIG. 5 shows the rounding process in the case where quantizer_scale=10 and the rounding precision is based on the process for counting fractions of 7 and over as a unit and disregarding the rest. The fourth value from the bottom is selected as a representative value from numerical values segmented every 10 values shown by an axis of abscissa. For example, the representative value of the numerical values which are equal to or larger than 7 and are equal to or smaller than 16 is set to 10.

The quantizing circuit 304 changes the rounding precision in accordance with the quantization scale value mentioned above and executes the quantization. Thus, the optimum quantization is executed in accordance with the nature of the image and the deterioration in picture quality caused by the image compression is minimized. That is, the quantization scale value is set to a small value in the case of an image which can be easily compressed and to a large value in the case of an image which is difficult to be compressed. The quantization is executed by the optimum rounding precision on the basis of the quantization scale value.

Subsequently, arithmetic operations of an example of the process for changing the rounding precision in accordance with the foregoing quantization scale value will be described. According to the arithmetic operations, AC coefficients F(v, u) of the DCT coefficients to which the DCT arithmetic operations were performed are quantized by using the following arithmetic operational expressions (1) and (2), thereby obtaining quantized DCT coefficients QF(v, u).

$$wF(v, u)=16 \times F(v, u)/W(v, u) \quad (1)$$

$$QF(v, u)=[wF(v, u)+\{sign(wF(v, u)) \times (M \times quantizer\_scale)\}div32]div\ quantizer\_scale \quad (2)$$

In the above expressions, (v, u) denotes coordinates of each coefficient in the DCT block and W(v, u) shows the weight coefficient (Intra_Quantizer_Matrix) for each coefficient as shown in FIG. 6. The weight coefficient has been prepared as an initial value in the MPEG2. An operator [div] shows a dividing arithmetic operation for omitting a decimal part. Numerical values [16] and [32] in the expressions (1) and (2) have conveniently been used for a bit shift (matching of the carry) of each numerical value that is used for the arithmetic operations mentioned above.

An operator [sign] denotes that the following case classification is executed. In this instance, an expression like a C language as a programming language of a computer or the like is used f or convenience of explanation.

if (x>0) sign(x)=1;
else if (x==0) sign(x)=0;
else if (x<0) sign(x)=−1;

That is, if wF(v, u) is larger than 0, sign(wF(v, u)) is set to 1. If wF(v, u) is equal to 0, sign(wF(v, u)) is set to 0. If wF(v, u) is smaller than 0, sign(wF(v, u)) is set to −1. In this manner, the calculations are executed.

A value M in the expression (2) indicates a parameter which can be set every quantization scale (quantizer_scale) value. For example, in the case of selecting the digital interface as an input interface, the value M is set as follows. In this instance, an expression like a C language as a programming language of a computer or the like is used for convenience of explanation.

if (quantizer_scale==1) M=16;
else if (quantizer_scale==2) M=15;
else if (quantizer_scale==3) M=14;
else if (quantizer_scale==4) M=13;
else if (quantizer_scale==5) M=12;
else if (quantizer_scale==6) M=11;
else M=10;

According to the above expression, if the value of quantizer_scale is equal to [1], the value M is set to [16]. If the value of quantizer_scale is equal to [2], the value M is set to [15]. If the value of quantizer_scale is equal to [3], the value M is set to [14] . . . (in a manner similar to the above) . . . If the value of quantizer_scale is equal to or larger than [7], the value M is set to [10]. By such a change in parameter M, the arithmetic operation for changing the rounding precision in correspondence to the value of quantizer_scale is realized. That is, the smaller the value of quantizer_scale (quantization scale) is, the higher and finer the rounding precision is. When the quantization scale value increases, the rounding precision is lowered and the quantization is more coarsely executed. The rounding precision is set by the value M as mentioned above.

The DCT coefficients F(v, u) are quantized by the arithmetic operations as mentioned above, thereby obtaining the quantized DCT coefficients QF(v, u). According to such quantization, they can be quantized lest the amplitudes of the DCT coefficients are increased. Thus, encoding noises are suppressed and it is effective particularly upon dubbing which takes into consideration of a pixel shifting process such as an image edit or the like.

Further, since the quantization rounding precision is controlled in accordance with the quantization scale (quantizer_scale) value, the different quantization rounding precision is set in each of the case of the image whose compression is easy, that is, the case where the quantizer_scale value is small and the case of the image whose compression is difficult, that is, the case where the quantizer_scale value is large. Therefore, the optimum quantization can be performed in accordance with the nature of the image and the image deterioration caused by the image compressing process can be minimized.

A case where the analog input unit 120 in FIG. 1 mentioned above is selected by the input selection signal and the analog interface is used as an input interface of the video signal will now be considered. In the case of using the analog interface as an input interface of the video signal, if the quantization scale is set and the quantization is executed under the same conditions as those in the case of using the digital interface, the noise components are emphasized and an S/N ratio is deteriorated by the unstable factors peculiar to the analog circuit.

According to the embodiment of the invention, therefore, when the rounding process of the decimal part in the quantizing step in the MPEG is executed, the quantization rounding precision is made settable every value of the quantization scale (quantizer_scale). Further, the different quantization rounding precision is set in each of a digital interface environment and an analog interface environment. Thus, the optimization of the quantization rounding precision in both of the digital interface and the analog interface is realized.

For example, the value M in the foregoing expression (2) is set as follows. In this instance, an expression like a C language as a programming language of a computer or the like is used for convenience of explanation.

if (analog input) {
 if (quantizer_scale==1) M=15;
  else if (quantizer_scale==2) M=14;
  else if (quantizer_scale==3) M=13;
  else if (quantizer_scale==4) M=12;
  else if (quantizer_scale==5) M=11;
  else if (quantizer_scale==6) M=10;
  else M=9;
}
else{//digital input
 if (quantizer_scale==1) M=16;
  else if (quantizer_scale==2) M=15;
  else if (quantizer_scale==3) M=14;
  else if (quantizer_scale==4) M=13;
  else if (quantizer_scale==5) M=12;
  else if (quantizer_scale==6) M=11;
  else M=10;
}

That is, in the case where the SDI input unit 101 is selected and the digital interface is used as an input interface of the video signal, in a manner similar to the foregoing example, if the value of quantizer_scale is equal to [1], the value M is set to [16]. If the value of quantizer_scale is equal to [2], the value M is set to [15]. If the value of quantizer_scale is equal to [3], the value M is set to [14] . . . (in a manner similar to the above) . . . If the value of quantizer_scale is equal to or larger than [7], the value M is set to [10].

On the other hand, in the case where the analog input unit 120 is selected and the analog interface is used as an input interface of the video signal, the value M corresponding to each quantizer_scale value in the digital interface is reduced one by one. That is, if the value of quantizer_scale is equal to [1], the value M is set to [15]. If the value of quantizer_scale is equal to [2], the value M is set to [14]. If the value of quantizer_scale is equal to [3], the value M is set to [13] . . . (in a manner similar to the above) . . . If the value of quantizer_scale is equal to or larger than [7], the value M is set to [9].

As mentioned above, in the embodiment, if the analog interface is selected as an input interface of the video signal, the quantization rounding precision which can be set every quantizer_scale value is set to be lower than the set value in the digital interface so as to be shifted in such a direction as to further omit the figures after a predetermined numerical value. Thus, the DCT coefficients are quantized so as not to further increase the amplitudes. Therefore, the noises or the like which are peculiar to the analog interface can be also suppressed together with the encoding noises, and the picture quality can be optimized.

Figure 7B:
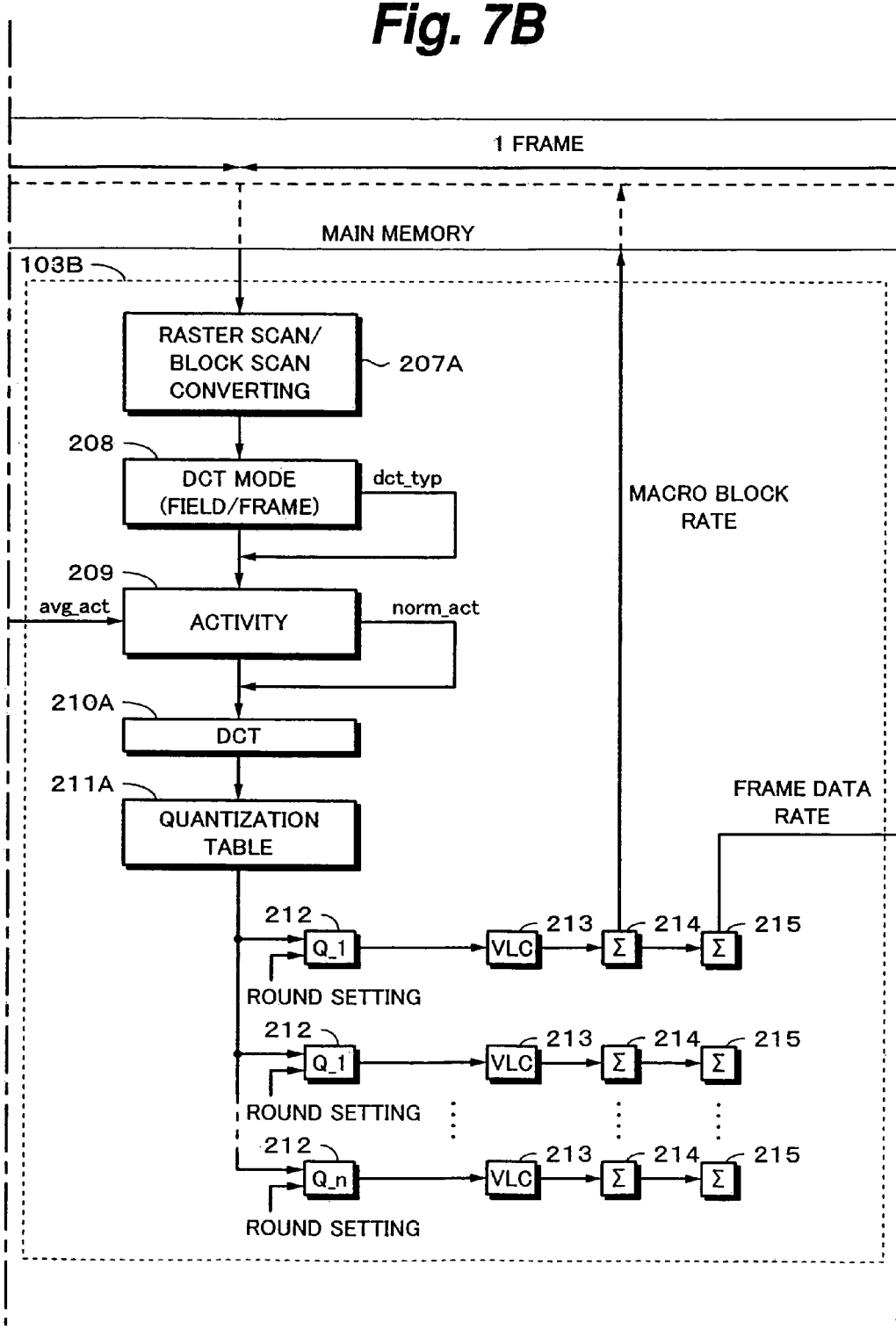
FIG. 7 is a block diagram more specifically showing the example of the MPEG encoder.
Figure 7C:
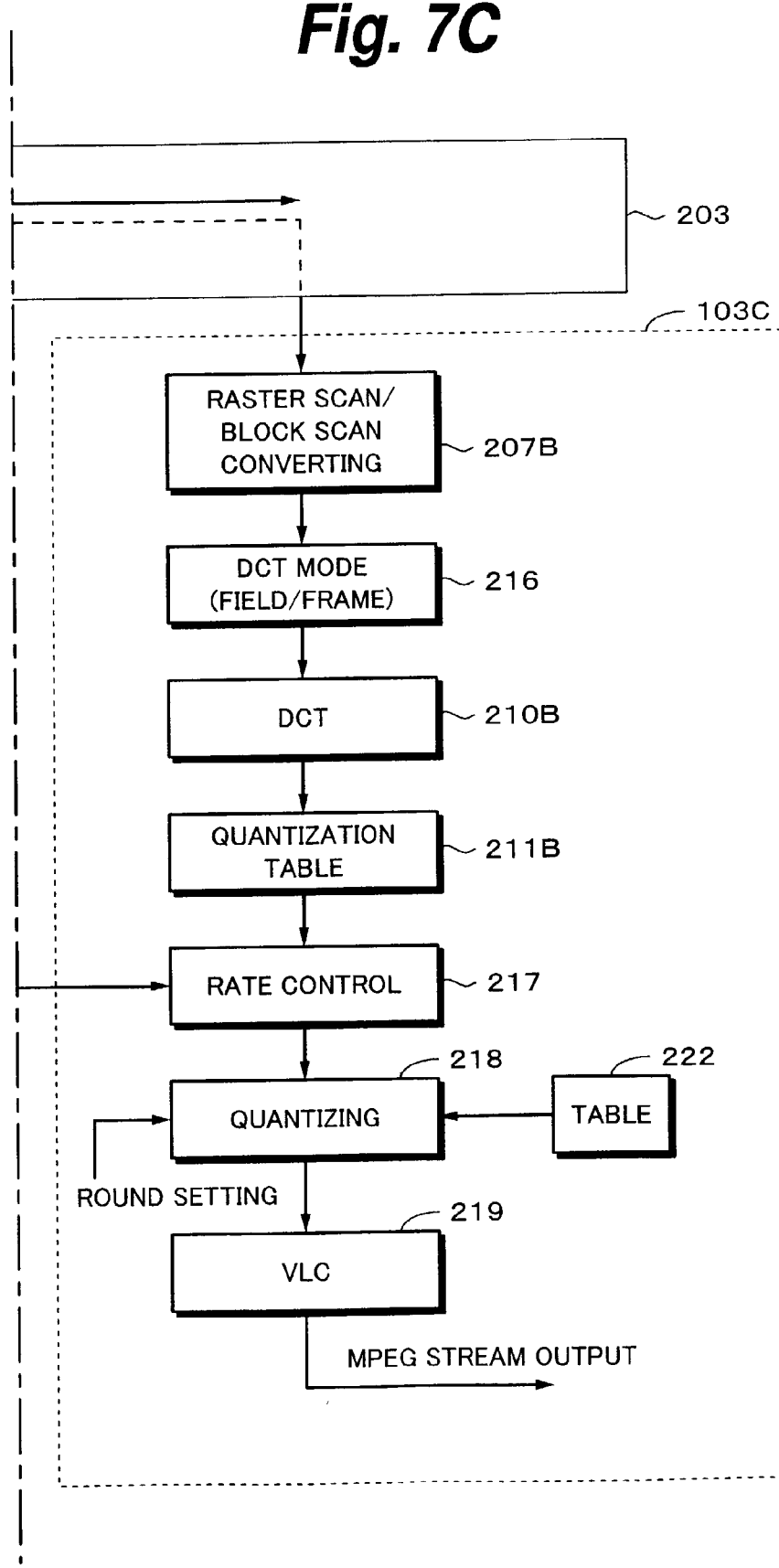

FIG. 7 shows more specifically a construction of an example of the MPEG encoder 103 mentioned above. The MPEG encoder 103 comprises: an input field activity averaging processing unit 103A; a preencode processing unit 103B; and an encode processing unit 103C. The input field activity averaging processing unit 103A obtains an average value of activities (weight coefficients) of the inputted video data and sends it to the preencode processing unit 103B. The preencode processing unit 103B estimates an amount of codes which are generated due to the quantization of the input video data by using the average value of the activities. On the basis of a result of the estimation, the encode processing unit 103C executes the actual quantization to the input video data while controlling the code amount, further variable length encodes the quantized video data, and outputs it as an MPEG ES.

A timing generator TG 220 forms a timing signal which is necessary in the MPEG encoder 103 on the basis of a horizontal sync signal HD, a vertical sync signal VD, and a field sync signal FLD supplied from the timing generator TG 102 in FIG. 1 and generates it. A CPU I/F block 221 is an interface with the system controller 117 in FIG. 1 and controls the operation of the MPEG encoder 103 on the basis of a control signal and data which are transmitted and received via the CPU I/F block 221.

First, a process of the input field activity averaging processing unit 103A will be described. On the basis of the input selection signal which is outputted from the system controller 117 in accordance with the operation of the operation panel 122, as an input interface of the video signal, the SDI input unit 101 selects either the analog interface which is inputted via the analog input unit 120 or the digital interface which is directly inputted to the SDI input unit 101.

The video data outputted from the SDI input unit 101 and inputted to the MPEG encoder 103 is supplied to an input unit 201 and converted into an interface suitable for storage into a main memory 203, and a parity check is executed. The video data outputted from the input unit 201 is supplied to a header forming unit 202, and each of headers such as sequence_header, quantizer_matrix, gap_header, etc. in the MPEG is extracted by using a vertical blanking interval or the like. The extracted headers are stored into the main memory 203. Those headers are mainly designated from the CPU I/F block 221. In the header forming unit 202, in intervals other than the vertical blanking interval, the video data supplied from the input unit 201 is stored into the main memory 203.

The main memory 203 is a frame memory of the image. In this memory, rearrangement of the video data, absorption of the system delay, or the like is executed. The rearrangement of the video data is performed by, for example, a method whereby read addresses from the main memory 203 are controlled by an address controller (not shown). In the diagram, 8 lines, 0.5 frame, and 1 frame shown in the block of the main memory 203 indicate delay values and reading timing from the main memory 203 is shown. They are properly controlled on the basis of an instruction from the timing generator TG 220.

A raster scan/block scan converting unit 204 extracts the video data stored in the main memory 203 every line every macro block which is handled by the MPEG and sends it to an activity unit 205.

The macro block which is handled by the MPEG is a matrix of 16 pixels×16 lines. The MPEG encoder 103 executes a process for obtaining an activity based on only the first field. Therefore, the process can be started at a point when the data of up to eight lines of the first field has been stored in the main memory 203. Actually, the process is properly started by an instruction from the timing generator TG 220.

The activity unit 205 calculates the activity of each macro block. The MPEG encoder 103 calculates the activity only from the first field and outputs a result of the calculation as a field activity signal field_act. The signal field_act is supplied to an averaging unit 206, the signal of one field is accumulated, and its average value avg_act is obtained. The average value avg_act is supplied to an activity unit 209 of the preencode processing unit 103B, which will be explained hereinlater. The activity unit 209 executes a preencoding process by using the average value avg_act.

Therefore, after the average value of the activity in the first field was found, the preencoding process which considers the adaptive quantization can be executed by using the average value.

Subsequently, the preencode processing unit 103B will be explained. A raster scan/block scan converting unit 207A fundamentally executes a process similar to that of the raster scan/block scan converting unit 204 mentioned above. Since the raster scan/block scan converting unit 207A is provided for the preencoding process for estimating the code amount, the video data of both of the first and second fields is necessary. Therefore, in the raster scan/block scan converting unit 207A, a macro block of a size of 16 pixels×16 lines which is handled by the MPEG can be constructed at a point when the data of up to eight lines of the second field has been stored into the main memory 203. At this time point, the process can be started. Actually, the process is properly started by an instruction from the timing generator TG 220.

The video data outputted from the raster scan/block scan converting unit 207A is supplied to a DCT mode unit 208. The DCT mode unit 208 determines by which of the field DCT encoding mode or the frame DCT encoding mode is used for encoding.

The video data is not actually encoded here, but an absolute value sum of differential values between the pixels which are adjacent in the vertical direction is calculated in the field DCT encoding mode, such an absolute value sum is also calculated in the frame DCT encoding mode, those absolute value sums are compared, and the encoding mode of the smaller absolute value sum is selected. A result of the selection is temporarily inserted as a flag, that is, as DCT mode type data dct_typ into the stream and transferred to the post stage.

The activity unit 209 fundamentally executes a process similar to that of the activity unit 205 mentioned above. However, the activity unit 209 is provided to execute the preencoding process as mentioned above and calculates an activity of each macro block by using the data of both of the first field and the second field. After the activity was obtained, a normalization activity Nact is obtained by using the average value avg_act of the field activities obtained from the averaging unit 206 mentioned above. The normalization activity Nact is temporarily inserted as a flag, that is, as normalization activity data norm_act into the stream and transferred to the post stage.

An output of the activity unit 209 is supplied to a DCT unit 210A. The DCT unit 210A divides the supplied macro block into DCT blocks each comprising 8 pixels×8 pixels, executes a 2-dimensional DCT to the DCT blocks, and forms DCT coefficients. The DCT coefficients are supplied to a quantization table unit 211A.

The quantization table unit 211A executes quantization based on a quantization matrix (quantizer_matrix) to the DCT coefficients converted by the DCT unit 210A. An output of the quantization table unit 211A is supplied to a multistage quantizing unit comprising a plurality of Q_n (quantizing) units 212, 212, . . . , VLC units 213, 213, . . . , accumulating units Σ 214, 214, . . . , and accumulating units Σ 215, 215, . . . The DCT coefficients quantized by the quantization table unit 211A are quantized to multistage by the quantizing unit in such a multistage step.

In the Q_n units 212, 212, . . . , the DCT coefficients are quantized by using different quantization scales (quantizer_scale) Q, respectively. The values of the quantization scales Q have been predetermined by, for example, the standard of the MPEG2. The Q_n units 212, 212, . . . are constructed by, for example, 31 quantizers on the basis of this standard. At this time, n=31 and the Q_n units 212, 212, . . . are a Q_1 unit, a Q_2 unit, . . . , and a Q_31 unit. The respective quantizers execute the total of 31 steps of the quantization of the DCT coefficients by using quantization scales Qn allocated to those quantizers. Herein below, a quantization scale value corresponding to each of the Q_n units 212, 212, . . . is assumed to be a quantization scale Qn value.

The Q_n units 212, 212, . . . quantize the DCT coefficients by using the expression (2) mentioned above. In this instance, as mentioned above, the value M as a value for setting the rounding precision is set into each of the Q_n units 212, 212, . . . in accordance with the value of each quantization scale Qn. Further, in the embodiment, the value M which is set into each of the Q_n units 212, 212, . . . is switched in accordance with the selection of the analog interface or the digital interface to be used as an input interface of the video signal.

For example, the value M (assumed to be a value Ma) corresponding to the analog interface and the value M (assumed to be a value Md) corresponding to the digital interface are previously stored into each of the Q_n units 212, 212, . . . in accordance with the allocated quantization scale Qn. The input selection signal is outputted from the system controller 117 in accordance with the operation to the operation panel 122. Either the analog interface or the digital interface is selected by the SDI input unit 101. At the same time, a round setting signal is outputted from the system controller 117. The round setting signal is supplied to each of the Q_n units 212, 212, . . . via the CPU I/F block 221. In the Q_n units 212, 212, . . . , the value Ma and the value Md are switched in response to the round setting signal.

The round setting signal can be also used as a table control signal for controlling the loading of a set of a combination of the quantization scale values Qn and the value M corresponding to each of the analog interface and the digital interface from the system controller 117 into a table 222, which will be explained hereinlater.

The DCT coefficients of each quantization scale Qn quantized in the Q_n units 212, 212, . . . by the rounding precision based on the value M according to the input interface are supplied to the VLC units 213, 213, . . . , respectively. In the VLC units 213, 213, . . . , a scan such as a zigzag scan or the like is performed to the DCT coefficients of each quantization scale Qn, the VLC table based on a 2-dimensional Huffman code or the like is referred to, and the DCT coefficients are variable length coded.

The data which was variable length coded in the VLC units 213, 213, . . . is supplied to the corresponding accumulating units Σ 214, 214, . . . and the generation code amounts are accumulated every macro block. The generation code amount of each macro block is supplied to the main memory 203 every quantization scale Qn, temporarily inserted as a flag into the stream, and transferred to the post stage. In the case of using the 31 kinds of quantizers as mentioned above, 31 kinds of generation code amounts corresponding thereto are obtained every macro block.

The generation code amounts of each macro block outputted from the accumulating units Σ 214, 214, . . . are supplied to the accumulating units Σ 215, 215, . . . , respectively. From the generation code amounts of each macro block obtained by the accumulating units Σ 214, the accumulating units Σ 215, 215, . . . select the code amount corresponding to the generation code amount of each macro block corresponding to the case where it is quantized by quantizer_scale (=mquant) which considers visual characteristics and was obtained as mquant=Q_n×norm_act by using the normalization activity data norm_act obtained by the activity unit 209. The accumulating units Σ 215, 215, . . . accumulate the selected code amounts as many as the frames.

A value obtained by accumulating the code amounts as many as the frames every quantization scale Qn by the accumulating units Σ 215, 215, . . . is set to the generation code amount (frame data rate) in the relevant frame and supplied to a rate control unit 217, which will be explained hereinlater. In the case of using the 31 kinds of quantizers as mentioned above, 31 kinds of generation code amounts corresponding thereto are obtained every frame.

Subsequently, the encode processing unit 103C will be described. The encode processing unit 103C executes a final encoding process. As mentioned above, the preencode processing unit 103B estimates the generation code amount of one frame in the case where various quantizing processes are executed. On the basis of the estimated generation code amount of one frame, the encode processing unit 103C encodes the data so that the generation code amount never exceeds a preset target generation code amount and outputs the MPEG ES.

Although the data which is used in the encode processing unit 103C has already been stored in the main memory 203, as mentioned above, the process can be started at a point when the generation code amount of one frame in the case where various quantizing processes are executed by the preencode processing unit 103B is estimated. In a manner similar to that mentioned above, the process in each unit of the encode processing unit 103C is properly started on the basis of the instruction from the timing generator TG 220.

The video data read out from the main memory 203 is processed by a raster scan/block scan converting unit 207B in a manner similar to the raster scan/block scan converting unit 207A mentioned above, so that the macro block of 16 pixels×16 lines is extracted. The extracted macro block is supplied to a DCT mode unit 216.

In a manner similar to the DCT mode unit 208 mentioned above, the DCT mode unit 216 determines either the field DCT encoding mode or the frame DCT encoding mode to be used for encoding. At this time, the encoding mode has already been decided in the DCT mode unit 208 and the decided encoding mode is temporarily inserted as DCT mode type data dct_typ into the stream. The DCT mode unit 216 detects the DCT mode type data dct_typ inserted into the stream and switches the field encoding mode and the frame encoding mode on the basis of the detected DCT mode type data dct_typ.

The macro block outputted from the DCT mode unit 216 is supplied to a DCT unit 210B and a 2-dimensional DCT is executed thereto on a unit basis of the DCT block consisting of 8 pixels×8 pixels in substantially the same manner as the DCT unit 210A mentioned above.

In substantially the same manner as the quantization table unit 211A mentioned above, a quantization table unit 211B quantizes the DCT coefficients transformed by the DCT unit 210B in accordance with a quantization matrix. The DCT coefficients quantized by the quantization table unit 211B are supplied to the rate control unit 217.

From frame data rates of the quantization scales Qn obtained by the accumulating units Σ 215, 215, . . . in the foregoing preencode processing unit 103B, the rate control unit 217 selects the frame data rate in which the generation code amount does not exceed the maximum generation code amount per frame and which is closest to a set value. The quantization scale (mquant) of each macro block used in the quantizer corresponding to the selected frame data rate is obtained again from the normalization activity data norm_act inserted into the stream and supplied to a quantizing unit 218.

The maximum generation code amount per frame is set by, for example, the system controller 117 and transferred to the rate control unit 217 via the CPU I/F block 221.

In this instance, the value of the quantization scale (mquant) can be reduced by one size every macro block in a range where it does not exceed a difference from the maximum generation code amount per frame which is set by the system controller 117 and transferred via the CPU I/F block 221. Thus, the generation code amount can be made to approach the maximum generation code amount per frame which is set by the system controller 117 and transferred via the CPU I/F block 221, and the high picture quality can be realized.

The quantizing unit 218 quantizes the DCT coefficients quantized by the quantization table unit 211B on the basis of the quantization scale (quantizer_scale) which is designated by the rate control unit 217 as mentioned above. At this time, since the quantization scale which is inputted from the rate control unit 217 is equal to the value of the quantization scale (mquant) obtained from the normalization activity data norm_, the proper quantization which considers the visual characteristics is executed.

The quantizing unit 218 quantizes the DCT coefficients by using the expression (2). In this instance, as mentioned above, the value M as a value for setting the rounding precision is set in accordance with the value of the quantization scales Qn which is used. Further, in the embodiment, the value M is switched in dependence on either the analog interface or the digital interface selected as an input interface of the video signal.

The table 222 in which the set of the value M for each of the quantization scales Qn corresponding to the analog interface or the set corresponding to the digital interface is loaded and stored by the system controller 117 via the CPU I/F block 221 is connected to the quantizing unit 218.

That is, as a set corresponding to the analog interface which has already been described, the following set is stored into the table 222.

quantization scale value=1 . . . value M=15
quantization scale value=2 . . . value M=14
quantization scale value=3 . . . value M=13
quantization scale value=4 . . . value M=12
quantization scale value=5 . . . value M=11
quantization scale value=6 . . . value M=10
quantization scale value ≧7 . . . value M=9

As a set corresponding to the digital interface, the following set is stored into the table 222.

quantization scale value=1 . . . value M=16
quantization scale value=2 . . . value M=15
quantization scale value=3 . . . value M=14
quantization scale value=4 . . . value M=13
quantization scale value=5 . . . value M=12
quantization scale value=6 . . . value M=11
quantization scale value ≧7 . . . value M=10

That is, either the set corresponding to the analog interface or the set corresponding to the digital interface is loaded and stored into the table 222 from the system controller 117 via the CPU I/F block 221 in accordance with either the analog interface or the digital interface selected by the input selection signal.

The combination of the quantization scale values and the values M is not limited to the above-mentioned example. The set of the quantization scale Qn values and the values M corresponding to each of the analog interface and the digital interface can be also preliminarily stored in the table 222. In this case, for example, control is made so as to read out the set corresponding to the selected input interface from the table 222 on the basis of the round setting signal.

The round setting signal which is outputted from the system controller 117 in accordance with the selection of either the analog interface or the digital interface is supplied to the quantizing unit 218 via the CPU I/F block 221. On the basis of the round setting signal, the set corresponding to the interface selected by the input selection signal between the set of the value M for each of the quantization scale Qn values corresponding to the analog interface and the set corresponding to the digital interface is loaded into the table 222. For example, when the analog interface is selected, the set corresponding to the analog interface is loaded into the table 222. On the basis of the loaded set, the rounding precision upon quantization in the quantizing unit 218 is set every quantization scale Qn value.

The rounding precision is set in accordance with the selected analog interface or digital interface as mentioned above and the DCT coefficients quantized by the quantizing unit 218 are supplied to a VLC unit 219. The scan such as a zigzag scan or the like is performed to the DCT coefficients which have been quantized and supplied to the VLC unit 219, the VLC table based on the 2-dimensional Huffman code is referred to, and the DCT coefficients are variable length coded. Further, a bit shifting process is executed to the variable length codes so as to be aligned on a byte unit basis and the resultant codes are outputted as an MPEG ES.

Although the explanation has been made with respect to the case where the process in the MPEG encoder 103 is executed by hardware, the invention is not limited to this example. The process of the MPEG encoder 103 can be also similarly realized by software. For example, it is also possible that the analog and digital input interfaces of the video signal are provided for a computer apparatus and the process is executed by a CPU, a memory, and the like by software installed on the computer. In the construction of the digital VTR mentioned above, the MPEG encoder 103 can be also replaced with a CPU and a memory.

Figure 9:
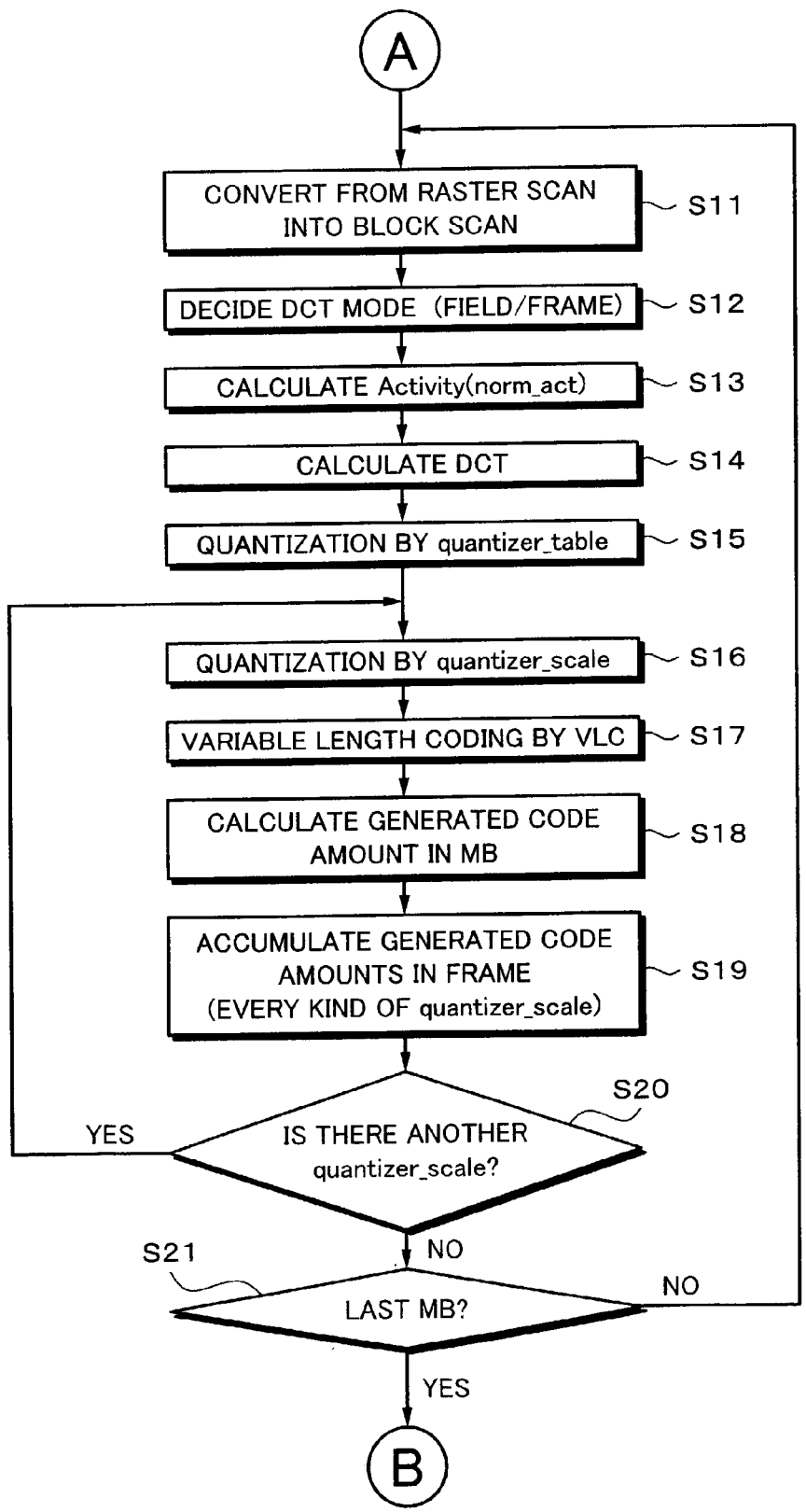
FIG. 9 is a flowchart of an example in the case where the process of the MPEG encoder is executed by software.
Figure 10:
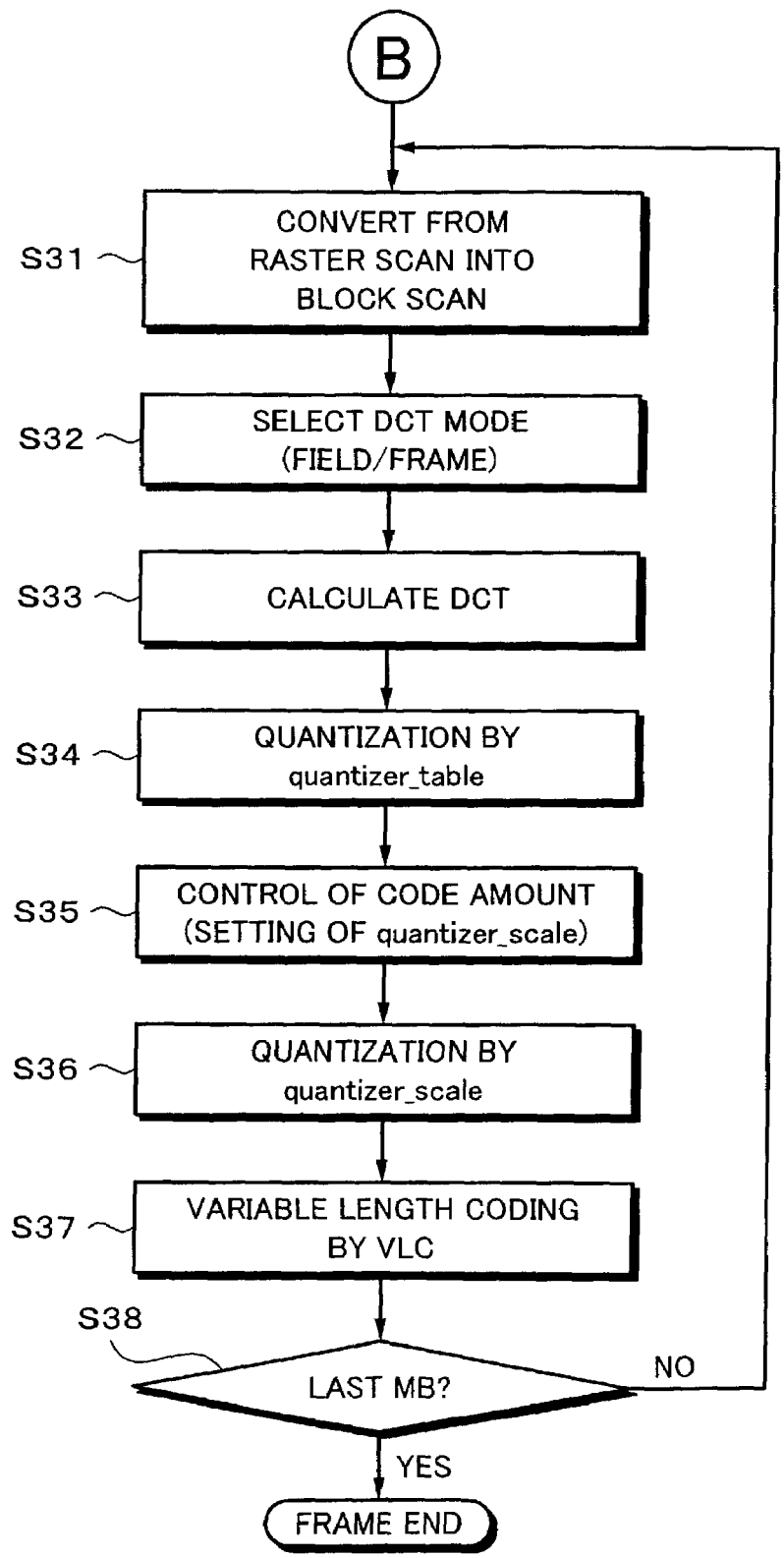
FIG. 10 is a flowchart of an example in the case where the process of the MPEG encoder is executed by software.

FIGS. 8 to 10 are flowcharts for an example in the case of executing the process of the MPEG encoder 103 by software. Since processes which are executed in accordance with the flowcharts of FIGS. 8 to 10 are similar to those by the hardware mentioned above, they will be schematically explained hereinbelow in correspondence to the processes which are executed in the hardware. In FIGS. 8 to 10, reference characters A and B denote that the processing step advances to the processing step shown by each corresponding reference character A or B.

Steps S1 to S7 shown in FIG. 8 correspond to the processes which are executed by the input field activity averaging processing unit 103A mentioned above. Steps S11 to S21 shown in FIG. 9 correspond to the processes which are executed by the preencode processing unit 103B mentioned above. Steps S31 to S38 shown in FIG. 10 correspond to the processes which are executed by the encode processing unit 103C mentioned above.

Prior to starting the processes, which of the analog interface or the digital interface is used as an input interface of the video signal is selected. The selection result is once stored into, for example, the memory.

In FIG. 8, the video data is fetched via the selected input interface between the analog interface and the digital interface in first step S1. In next step S2, each header in the MPEG in a vertical blanking interval is extracted from the fetched video data and stored into the memory. In an interval other than the vertical blanking interval, the fetched video data is stored into the memory.

In step S3, the video data is converted from the raster scan data into the block scan data and the macro blocks are extracted. This process is executed, for example, by controlling read addresses at the time of reading out the video data stored in the memory. In step S4, an activity calculation by the first field is executed to the video data extracted as macro blocks and an activity Activity(act) as a result of the calculation is accumulated in step S5 and stored as an accumulation value sum into the memory. The processes in steps S3 to S5 are repeated until it is decided that a process of the last macro block in the first field has been finished in step S6. That is, the accumulation value sum is equal to the sum of the activities of the macro blocks of one field.

If it is determined in step S6 that the processes up to the last macro block in one field have been finished, the accumulation value sum stored in the memory is divided by the number of macro blocks of one field and an average value Activity(avg_act) of the field activity in which the activities of one field are averaged is obtained and stored into the memory.

When the average value Activity(avg_act) of the field activity is obtained, the processing routine advances to step S11 in FIG. 9. In step S11, the video data stored in the memory is converted from the raster scan data into the block scan data and the macro blocks are extracted in a manner similar to step S3 mentioned above.

In next step S12, by which of the field DCT encoding mode or the frame DCT encoding mode the DCT is executed is selected and a result of the selection is stored as DCT mode type data dct_typ into the memory. In step S13, both of the first and second fields are used, the activities of each macro block are calculated, and a normalization activity Activity(norm_act) is obtained by using the average value Activity(avg_act) of the field activity which has been obtained and stored in the memory in step S7 mentioned above. The obtained normalization activity Activity(norm_act) is stored into the memory.

In next step S14, the macro block extracted from the video data in step S11 is divided into the DCT blocks each consisting of 8 pixels×8 pixels and the 2-dimensional DCT is executed to the DCT blocks. The DCT coefficients obtained by transforming the DCT blocks by the 2-dimensional DCT are quantized by a quantization table (quantizer_table) in step S15. The processing routine advances to step S16.

By repeating the processes in steps S16 to S20 with respect to each of the quantization scale (quantizer_scale) Qn values, the processes corresponding to the foregoing Q_n units 212, 212, . . . , VLC units 213, 213, . . . , accumulating units Σ 214, 214, . . . , and accumulating units Σ 215, 215, . . . are executed. That is, in step S16, the quantization in the quantization scale Q=1 is executed to the DCT coefficients on the basis of the expression (2). In step S17, the quantized DCT coefficients are variable length coded with reference to the VLC table. In step S18, the generation code amount in the macro block according to the variable length coding is calculated. In step S19, the generation code amount of each macro block obtained in step S18 of one frame is accumulated. The presence or absence of the next quantization scale Qn is discriminated in step S20. If the presence of the next quantization scale Qn is determined, the processing routine is returned to step S16 and the process based on the next quantization scale Qn is executed. The generation code amount of one frame of each quantization scale Qn is stored into the memory.

In the process in step S16, the value M as a value for setting the rounding precision upon quantization is set in accordance with the value of each quantization scale Qn. Further, the value M is switched as mentioned above in accordance with the selection of the analog interface or the digital interface as an input interface of the video signal. The value of each quantization scale Qn corresponding to each of the analog interface and the digital interface can be generated in a program manner as mentioned above by using, for example, an expression like a C language, or the Qn values which have previously been stored in a memory medium such as a memory or the like can be also used.

If an accumulation value of the generation code amounts in the frames is obtained with respect to the values of all of the quantization scales Qn in step S20, whether the processes up to the last macro block (MB) of one frame have been finished or not is discriminated in step S21. If the processes up to the last macro block are not finished yet, the processing routine is returned to step S11. If the processes up to the last macro block have been finished and the generation code amount of one frame is estimated, the processing routine advances to step S31 in FIG. 10 and the actual encoding process is executed.

In step S31, the video data stored in the memory is converted from the raster scan data into the block scan data and the macro blocks are extracted in a manner similar to step S11 mentioned above. In step S32, the DCT encoding mode is set on the basis of the DCT mode type data dct_typ stored in the memory in step S12 mentioned above.

In step S33, the macro block extracted from the video data in step S31 is divided into the DCT blocks each consisting of 8 pixels×8 pixels and the 2-dimensional DCT is executed to the DCT blocks. The DCT coefficients obtained by transforming the DCT blocks by the 2-dimensional DCT are quantized by the quantization table (quantizer_table) in step S34. The processing routine advances to step S35.

In step S35, in order to control the amount of codes which are generated in the actual encoding process on the basis of the generation code amount of one frame of each quantization scale Qn estimated in steps S11 to S21 mentioned above, the quantization scale Qn which is used in step S36, which will be explained hereinlater, is set every macro block.

The processing routine advances to step S36. The DCT coefficients quantized by using the quantization scale Qn set in step S35 and by using the quantization table in step S34 are quantized. In step S36, the value M for setting the rounding precision upon quantization is set every macro block on the basis of the value of the quantization scale Qn which is used in the quantization and the selection result of the analog interface or the digital interface as an input interface of the video data. The quantization of the macro block is executed by the rounding precision set by the value M.

The DCT coefficients quantized in step S36 are variable length coded in next step S37 with reference to the VLC table. Whether the processes up to the last macro block of one frame have been finished or not is discriminated in step S38. If it is determined that the processes up to the last macro block of one frame are not finished yet, the processing routine is returned to step S31. The quantizing process and the variable length coding process are executed to the next macro block. In step S37, if it is determined that the processes up to the last macro block of one frame have been finished, it is regarded that the encoding process of one frame has been finished.

Although the invention has been described above by regarding the preencoding process in steps S11 to S21 and the encoding process in steps S31 to S38 as different processes, the invention is not limited to such an example. For instance, the data obtained by the estimation of the generation code amount in steps S11 to S21 is stored into the memory and the data which is obtained by the actual encoding process is selected and extracted from the stored data. Thus, the processes in steps S31 to S38 can be assembled as a loop included in the process in steps S11 to S21.

The present invention is not limited to the foregoing embodiment but many modifications and variations are possible within the spirit and scope of the appended claims of the invention.

What is claimed is:

1. A signal processing apparatus comprising:
   a signal selector for selecting either an analog video signal or a digital video signal;
   a DCT arithmetic operator for executing a DCT arithmetic operation on a block unit basis on said selected analog video signal or digital video signal;
   a quantization scale value setter for setting a quantization scale value to quantize DCT coefficients obtained by said DCT arithmetic operator;
   a quantization rounding precision setter for setting quantization rounding precision in accordance with said set quantization scale value and said selected analog video signal or digital video signal; and
   a quantizer for quantizing said DCT coefficients on the basis of said set quantization scale value and said set quantization rounding precision.

2. An apparatus according to claim 1, wherein said quantization rounding precision setter sets said quantization rounding precision corresponding to said analog interface unit in such a direction as to round down figures more than those in said quantization rounding precision corresponding to said digital interface unit.

3. An apparatus according to claim 1, wherein said quantization rounding precision setter sets said quantization rounding precision corresponding to a case where said quantization scale value is large in such a direction as to round down figures more than those in said quantization rounding precision corresponding to a case where said quantization scale value is small.

4. An apparatus according to claim 1, further comprising variable length encoder for variable length coding said quantized DCT coefficients.

5. A signal processing method comprising the steps of:
   selecting either an analog video signal or a digital video signal;
   executing a DCT arithmetic operation on a block unit basis on said selected analog video signal or digital video signal;
   setting a quantization scale value to quantize DCT coefficients obtained by said DCT arithmetic operation;
   setting quantization rounding precision in accordance with said set quantization scale value and said selected analog video signal or digital video signal; and
   quantizing said DCT coefficients on the basis of said set quantization scale value and said set quantization rounding precision.

* * * * *